United States Patent
Shi et al.

(10) Patent No.: US 10,068,186 B2
(45) Date of Patent: Sep. 4, 2018

(54) MODEL VECTOR GENERATION FOR MACHINE LEARNING ALGORITHMS

(71) Applicants: Xingtian Shi, Shanghai (CN); Wen-Syan Li, Shanghai (CN)

(72) Inventors: Xingtian Shi, Shanghai (CN); Wen-Syan Li, Shanghai (CN)

(73) Assignee: SAP SE, Walldorf (DE)

( * ) Notice: Subject to any disclaimer, the term of this patent is extended or adjusted under 35 U.S.C. 154(b) by 659 days.

(21) Appl. No.: 14/663,701

(22) Filed: Mar. 20, 2015

(65) Prior Publication Data
US 2016/0275413 A1 Sep. 22, 2016

(51) Int. Cl.
G06N 99/00 (2010.01)
G06N 3/12 (2006.01)

(52) U.S. Cl.
CPC .......... G06N 99/005 (2013.01); *G06N 3/126* (2013.01)

(58) Field of Classification Search
None
See application file for complete search history.

(56) References Cited

U.S. PATENT DOCUMENTS

| | | | |
|---|---|---|---|
| 5,692,107 A | 11/1997 | Simoudis et al. | |
| 6,523,015 B1 * | 2/2003 | Bera | G06K 9/6269 706/12 |
| 7,644,863 B2 | 1/2010 | Chen et al. | |
| 7,801,836 B2 | 9/2010 | Sureka | |
| 8,364,613 B1 | 1/2013 | Lin et al. | |
| 8,370,280 B1 | 2/2013 | Lin et al. | |
| 8,386,401 B2 | 2/2013 | Virkar et al. | |
| 8,392,116 B2 | 3/2013 | Lehmann et al. | |
| 8,533,224 B2 | 9/2013 | Lin et al. | |
| 2002/0138492 A1 | 9/2002 | Kil | |
| 2007/0150424 A1 | 6/2007 | Igelnik | |
| 2010/0169245 A1 | 7/2010 | Basel et al. | |
| 2013/0024170 A1 | 1/2013 | Dannecker et al. | |
| 2014/0067485 A1 | 3/2014 | Richter et al. | |
| 2014/0136452 A1 | 5/2014 | Wellman et al. | |
| 2014/0188768 A1 | 7/2014 | Bonissone et al. | |
| 2014/0279753 A1 | 9/2014 | Dalessandro et al. | |
| 2015/0379429 A1 * | 12/2015 | Lee | G06N 99/005 706/11 |

* cited by examiner

Primary Examiner — Alan Chen
(74) Attorney, Agent, or Firm — Brake Hughes Bellermann LLP (57) ABSTRACT

Techniques are described for forming a machine learning model vector, or just model vector, that represents a weighted combination of machine learning models, each associated with a corresponding feature set and parameterized by corresponding model parameters. A model vector generator generates such a model vector for executing automated machine learning with respect to historical data, including generating the model vector through an iterative selection of values for a feature vector, a weighted model vector, and a parameter vector that comprise the model vector. Accordingly, the various benefits of known and future machine learning algorithms are provided in a fast, effective, and efficient manner, which is highly adaptable to many different types of use cases.

20 Claims, 4 Drawing Sheets

MODEL VECTOR GENERATION FOR MACHINE LEARNING ALGORITHMS

TECHNICAL FIELD

This description relates to machine learning algorithms.

BACKGROUND

Computers have historically been used in a variety of manners to supplement, augment, or replace human capabilities in performing various tasks. Examples include performing otherwise-burdensome or time-consuming calculations, providing for the storage and querying of large amounts of data, and providing visualizations to enable graphical manipulation of data.

One arena in which people have sought to obtain assistance from computers is decision-making, e.g., classifying, identifying, reasoning about, or predicting a nature of known or future data. Related technical fields are known to include, e.g., artificial intelligence (AI), or machine learning. Such technical fields are challenging, because they seek to recreate, on a large scale, the types of subjective, irregular, non-linear, and/or nuanced distinctions that human beings routinely make, which are not typically solvable simply through the manipulation of large amounts of data and/or high processing speeds.

In order to implement these types of technology, machine learning algorithms and associated machine learning models have been developed. However, within the various technical fields in which such technology is deployed, such algorithms and models have had varying degrees of success, and, moreover, different technical fields may experience more or less success with a given machine learning algorithm than another machine learning algorithm. Further, even when a suitable machine learning algorithm is known to exist for a corresponding type of decision-making problem, the machine learning algorithm must be configured correctly in order to provide acceptable outcomes.

In short, it is difficult to select and configure a machine learning algorithm to obtain desired outcomes within an acceptable time period, and/or with an acceptable level of resources consumed. As a result, potential users often do not obtain the benefits of such machine learning algorithms.

SUMMARY

In the present description, techniques are described for forming a machine learning model vector, or just model vector, that represents a weighted combination of machine learning models, each associated with a corresponding feature set and parameterized by corresponding model parameters. In other words, such a model vector represents a "vector of vectors" in which a feature vector, weighted model vector, and parameter vector each represent a plurality, respectively, of feature subsets, weighted learning models, and parameters.

According to one general aspect, a computer program product is tangibly embodied on a non-transitory computer-readable storage medium and includes instructions that, when executed, are configured to cause at least one processor to determine a model vector $<d_t^h, w_t^h, \delta_t^h>$ in which $d_t^h$ represents a feature vector including t feature subsets of a feature set, $w_t^h$ represents a weighted model vector including t weighted automated learning models, and $\delta_t^h$ represents t parameter sets parameterizing the $w_t^h$ weighted automated learning models. The instructions, when executed, are further configured to cause the at least one processor to adjust weights of $w_t^h$ to obtain an updated $w_t^h$, $w_t^{h+1}$, based on performance evaluations of the $_t$ weighted automated learning models, and based on $w_t^h$, search a feature solution space to obtain t updated feature subsets of the feature set, to thereby obtain an updated $d_t^h$, $d_t^{h+1}$, search a parameter solution space to obtain t updated parameter sets, to thereby obtain an updated $\delta_t^h$ $\delta_t^{h+1}$, and determine an optimized model vector $(d_t^{h+1}, w_t^{h+1}, \delta_t^{h+1})$.

According to another general aspect, a computer-implemented method for executing instructions stored on a non-transitory computer readable storage medium includes determining a model vector $<d_t^h, w_t^h, \delta_t^h>$, in which $d_t^h$ represents a feature vector including t feature subsets of a feature set, $w_t^h$ represents a weighted model vector including t weighted automated learning models, and $\delta_t^h$ represents t parameter sets parameterizing the $w_t^h$ weighted automated learning models, and adjusting weights of $w_t^h$ to obtain an updated $w_t^h$, $w_t^{h+1}$, based on performance evaluations of the $_t$ weighted automated learning models, and based on $w_t^h$. The method further includes searching a feature solution space to obtain t updated feature subsets of the feature set, to thereby obtain an updated $d_t^h$, $d_t^{h+1}$, searching a parameter solution space to obtain t updated parameter sets, to thereby obtain an updated $\delta_t^h$, $\delta_t^{h+1}$ and determining an optimized model vector $(d_t^{h+1}, w_t^{h+1}, \delta_t^{h+1})$.

According to another general aspect, a system includes at least one processor, and instructions recorded on a non-transitory computer-readable medium, and executable by the at least one processor. The system includes a model vector generator configured to generate a model vector for executing automated machine learning with respect to historical data, the model vector generator configured to generate the model vector through an iterative selection of values for a feature vector, a weighted model vector, and a parameter vector that comprise the model vector. The model vector generator includes a weight selector configured to obtain the weighted model vector including adjusting each weight associated with a corresponding automated machine learning model of a plurality of automated machine learning models obtained from a model pool, wherein a magnitude of each weight is adjusted up or down as needed during each iteration to reflect a relative contribution of each weighted learning model to an accurate operation of the weighted model vector. The model vector generator further includes a feature selector configured to obtain the feature vector including executing a meta-heuristic search of a feature solution space of a feature set of features of the historic data, the feature vector including a plurality of feature subsets, each corresponding to a weighted learning model of the weighted model vector, and a parameter selector configured to obtain the parameter vector including searching a parameter solution space of potential parameters for each learning model of the weighted model vector. Each iteration of the iterative selection of values for the feature vector, the weighted model vector, and the parameter vector includes the adjusting of each weight, the searching of the feature solution space, and the searching of the parameter solution space.

The details of one or more implementations are set forth in the accompanying drawings and the description below. Other features will be apparent from the description and drawings, and from the claims.

DETAILED DESCRIPTION

Figure 1:
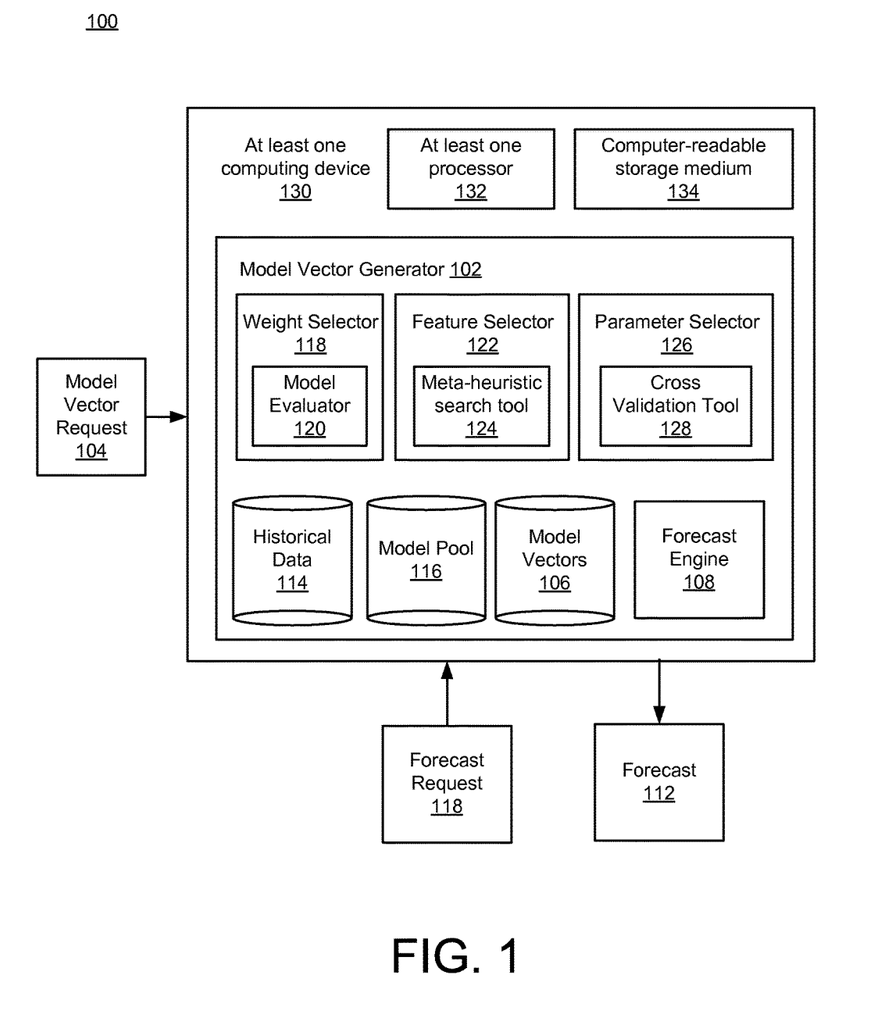
FIG. 1 is a block diagram of a system for model vector generation for machine learning algorithms.

FIG. 1 is a block diagram of a system 100 for model vector generation for machine learning algorithms. In the example of FIG. 1, a model vector generator 102 receives a model vector request(s) 104, and produces one or more resulting model vectors 106. Through the use of the resulting, optimized model vectors 106, a forecast engine 108 is enabled to receive, e.g., a forecast request 118, and return a corresponding forecast 112. In this way, as described in detail below, users of the system 100 may obtain the various benefits of known and future machine learning algorithms, in a fast, effective, and efficient manner, which is highly adaptable to many different types of use cases.

More particularly, model vectors 106 represent weighted combinations of machine learning models, each machine learning model associated with a corresponding feature set and parameterized by corresponding model parameters. As referenced above, such a model vector represents a "vector of vectors" in which a feature vector, weighted model vector, and parameter vector each represent a plurality, respectively, of feature subsets, weighted learning models, and parameters.

In this way, a plurality of different types of machine learning algorithms, each with associated strengths and weaknesses, may be deployed in conjunction with one another. Of these, those algorithms that are most successful in solving the problem at hand will be weighted more heavily, and be more determinative of the outcome, than those that are less successful in solving the problem at hand. Further, each machine learning algorithm is configured to include a corresponding feature set and parameter set, so that the resulting, optimized model vector is highly specialized. Moreover, techniques are described below for finding the optimized model vector using appropriate search strategies for selecting the appropriate weights in an iterative fashion, based on previously-determined weights from earlier iterations, and on performance evaluations of the corresponding learning models being weighted. Within such iterations, corresponding features and parameters may synchronously be selected as well, again using repeatable search strategies. In this way, as described, the optimized model vectors 106 may be obtained in a fast, effective, and efficient manner, even when a solution space of the model vector is large.

As referenced above, machine learning algorithms are generally known to attempt to create and utilize learning models to extract knowledge from data, where an example of such data is represented in FIG. 1 as historical data 114. In other words, the historical data 114 generally represents known data related to a problem, or type of problem, to be solved, and machine learning algorithm(s) conceptually attempt to reason from the known historical data 114 in order to thereafter make predictions or other decisions regarding specific subsets of the historical data 114, and/or entirely new data that is received and that is thought to be of a type relevant to the historical data 114.

In general, in this context, supervised learning refers to scenarios in which some or all of the historical data 114 has been categorized, annotated, labeled, or otherwise classified, e.g., through the addition of corresponding meta-data or other measurements by a human or machine user. In such scenarios, such portions of the historical data 114 may be referred to as training data, and the training data is used to configure a corresponding supervised machine learning algorithm, so that decisions (e.g., classifications) regarding later-received data may be made based thereon. In contrast, in unsupervised machine learning, no such training data exists or is used. Instead, the unsupervised machine learning algorithms may begin to be configured and implemented using just the historical data 114, and attempting to discern structure therein, without requiring prior categorization, annotation, labeling, or classification of any of the historical data 114.

With regard to both supervised and unsupervised machine learning, it will be appreciated that fields of use are numerous, spanning virtually all areas of decision-making, and include too many examples to mention more than a trivial subset thereof herein. For example, machine learning may be deployed in computer science to select network traffic rules, perform spam filtering, predict website performance, or perform optical character recognition. Machine learning is used in industry to predict needed maintenance or failures for equipment, or to predict areas of profitability (e.g., with respect to customers, or products to be sold). Other non-limiting use case scenarios include medical diagnoses, natural language processing, facial recognition, and data searching.

By way of brief example of a supervised learning algorithm, linear regression is a well-known supervised learning algorithm, represented as $$y = f(x) = a_1 \cdot x_1 + a_2 \cdot x_2 + \ldots + a_k \cdot x_k + \beta \qquad \text{Eq. 1}$$

In Eq. 1, k represents a number of dimensions of an input vector x. The cost function for Eq. 1 is then:

$$\underset{<\alpha_1, \alpha_2, \ldots, \alpha_k, \beta>}{m} \sum_{i=1}^{n} (y'_i - f(x))^2 \qquad \text{Eq. 2}$$

In Eq. 2, $y'_t$ represents the labeled data from relevant training data. Meanwhile, $<\alpha_1, \alpha_2, \ldots, \alpha_k, \beta>$ represents the parameter to tune.

To provide an example of unsupervised machine learning, k-means is an algorithm which seeks to cluster input data into a number of groups, so that each of the data points belongs to a cluster, of which the cluster centers are calculated with respect to the various cluster members.

More specifically, if $c_m$ refers to the center of a cluster, and $x_i$ as the data point, then the k-means algorithm may be modeled as:

$$\min_{c_m} \sum_{m=1}^{k} \sum_{x_i \in c_m} \|x_i - C_m\|^2 \qquad \text{Eq. 3}$$

As referenced above, different types of machine learning algorithms (supervised or unsupervised) can solve the same or similar types of problems. To pick the use case scenario of spam filtering, linear regression could be used to give numerical ratings, which indicate the categorization of a training set of emails, so that future emails could be classified as spam (or not spam). Meanwhile, k-means could be used to analyze a set of emails and create two or more clusters of emails, where some cluster(s) are identified as (types of) spam, and other(s) are classified as not being spam.

In such examples, the features for both types of algorithms might include, e.g., characteristics of individual emails, such as time of sending, included words or characters, or domain names of the email addresses. Thus, a set of such features may be defined, and one subset of the feature set may be selected for use with the linear regression algorithm, while another feature subset may be selected for use with the k-means algorithm.

With respect to parameters of the two example approaches, linear regression relies on, for example, different constant penalty value(s) for large coefficients and other constant(s) that characterize the regression model. On the other hand, k-means includes parameters such as the cluster center $c_m$.

Thus, in the following, "features" generally represent aspects of the input data (e.g., the historical data 114) used to configure the machine learning algorithm in question, so that such features might be used as inputs to different types of machine learning algorithms. In contrast, "parameters" generally refer to constraints or other aspects of the particular machine learning algorithm itself. For example, various (same or different) features of the historical data 114 might be used to configure different machine learning algorithms, where each such machine learning algorithm is defined with respect to certain corresponding parameters. That is, although it is possible that some overlap could occur between parameters of different machine learning algorithms, depending on an overall similarity of the algorithms in question, parameters in the present context generally refer to algorithm-specific aspects that must be tuned in order to achieve a desired outcome. For example, the cluster center $c_m$ of the k-means algorithm is a parameter that would have no explicit meaning in the context of the linear regression algorithm.

Again, many different types of machine learning algorithms exist. A few non-limiting examples of supervised machine learning algorithms would include support vector machines (SVMs), decision trees, and certain types of neural networks. Meanwhile, non-limiting examples of unsupervised machine learning algorithms would include various other types of clustering algorithms, principal component analysis (PCA), and the self-organizing map (SOM). These and many other types of known and future machine learning algorithms are not described herein in further detail, except as may be necessary or helpful in understanding operations of the system 100 of FIG. 1.

In general, though, it may be observed from Eqs. (2) and (3) that machine learning algorithms may often be thought of as a cost minimization problem(s), in which features and parameters are selected (e.g., tuned) to achieve a desired level of minimization. Even in the context of a single machine learning algorithm, a solution space(s) for appropriate feature subsets of feature sets, and for parameter values of relevant parameters, may be very large. That is, the cost function is in a high dimensional space, and the goal, e.g., of finding optimal parameters in that space, particularly within a reasonable time limit, may be difficult to achieve. Some techniques for exploring the solution space have been developed, e.g., the gradient descent and Quasi-Newton methods, but such techniques, in the context of known approaches to developing machine learning algorithms and associated machine learning models, have been insufficient.

In contrast, the system 100 of FIG. 1, as referenced above, provides for a <feature, weighted model, parameter> solution space structure, along with a unified approach(es) to traversing this solution space structure, including a heuristic search strategy for exploring the solution space intelligently, without requiring exhaustive searching. By way of notation, then, in the following description, M refers to the model space of the weighted models, D refers to the feature space or feature set, and P refers to the parameter space. Using this notation, and as a general statement of Eqs (1)-(3) above, automated machine learning can be modeled generally as the following equation:

$$\min f(d, \delta) \qquad \text{Eq. (4)}$$

Where $f \in M$, $d \in D$, $\delta \in P$. In other words, Eq. (4) represents attempted minimization of an error on the historical data 114, set with tuned feature set d and parameter setting δ.

With reference to the model space M, FIG. 1 illustrates a model pool 116 representing a repository storing different types of available models associated with corresponding automated machine learning algorithms. Then, in response to the model vector request, a weight selector 118 is configured to assign a weight to each model of the model pool 116.

In other words, the model vector request 104 generally specifies a request to enable automated machine learning with respect to specified current/future data, e.g., the historical data 114. In the example of FIG. 1, and subsequent examples, it is assumed that an originator of the model vector request 104 may include a non-technical user who wishes to obtain, e.g., assistance with a specific type of decision-making. That is, it is possible to create a generally accurate learning model in some scenarios, particularly when the user has knowledge and experience in the domain of data science, statistics, and/or machine learning, and is willing and able to construct desired model(s) on a case-by-case basis. In such cases, such users are generally required, e.g., to define a problem to be solved, gather a relevant dataset, choose potential features, choose at least one learning algorithm, tune the parameters of the selected algorithm, and evaluate and deploy the model. However, particularly for the types of non-technical (e.g., business) users referenced above, the user may have specialized skills in his or her area of expertise (e.g., business), but may lack the technical skills to construct and deploy a suitable model.

In FIG. 1, however, the user submitting the model vector request 104 may include only the type of input/output desired for the requested model vector, so that at a later time, the appropriate type and instance of input (e.g., forecast request 110) may result in a suitable, desired output (e.g., forecast 112). Rather than the user choosing a single model, the model vector generator 102 is configured to utilize the weight selector 118 to apply weights to all of the models of the model pool 116 (or a specified subset thereof). More specifically, as described below, the weight selector 118 may utilize a model evaluator 120 to evaluate each of a plurality of iterations of weight selections. Then, based on the evaluation results at each iteration, and on weight values of preceding iterations, additional iterations may continue until a suitable or optimized vector of weighted models is obtained.

In the context of the iterations of the weight selector 118, a feature selector 122 may be configured to utilize a met-heuristic search tool 124 to search for at least one corresponding feature subset to be used by each weighted model of the weighted model vector. Synchronously, and similarly, a parameter selector 126 may utilize a cross validation tool 128 to select tuned parameter sets for corresponding ones of the weighted models. Thus, the model vector request 104 may specify the historical data 114 (or subset thereof), and the model vector generator 102 may proceed to construct the model vector, including the weighted model vector, the feature vector, and the parameter vector.

By way of another simplified example, the historical data 114 may include customer relationship data for an ecommerce website. A business analyst submitting the model vector request 104 may wish to predict whether new customers will be profitable or unprofitable.

In this case, the historical data 114 of customers may include various features, such as, e.g., age, gender, income, occupation, residence, payment preference, purchasing frequency, and purchased items. The model pool 116 may include models related to, e.g., logistic regression, decision trees, support vector machines, neural networks, or k-nearest neighbor algorithms, or other machine learning algorithms. As known and described, each such algorithm may be associated with corresponding parameters, so that, for example, the decision tree model parameters may include a depth of the tree, or splitting criteria, while the support vector machine may include kernel types (e.g., linear, polynomial, or Sigmoid) and a tradeoff between a training error and margin (referred to in the field as parameter "c"), while for k-nearest neighbor, a number k and a voting strategy may provide examples of relevant parameters.

In order to further describe operations of the model vector generator 102, Eq. (4) and the associated notation above may be represented in a more detailed example of a cost function to be minimized as:

$$\min_c \sum w_t \cdot f_t(d_v, \delta_z) \qquad \text{Eq. (5)}$$

In other examples, rather than multiplying and summing, other combination strategies may be used, such as voting strategies for tallying contributions of the different weighted models.

Continuing the example notation, and since the number of models $f_t$ in the model pool 116 is finite, $w_t$ alone may be used to represent a unique reference or key for each model. In this way, a vector model of <feature, model, parameter> may be represented as $(d_t, w_t, \delta_t)$. It is assumed that appropriate constraints may be added for $\{w_t\}$, for example, $\Sigma_t w_t = 1$ (that is, all the weights of the weighted models should sum to a value of 1).

Using this notation, the model vector generator 102 may be said to be configured to search the <feature, model, parameter> space to find the optimal vectors $(d_t^h, w_t^h, \delta_t^h)$. Rather than using brute force or exhaustive search techniques to enumerate through the three sub-spaces, which would be overly time-consuming and resource-intensive (due to the high complexity levels even for small datasets and low-dimensional models), the model vector generator 102 is configured to implement heuristic-based approach(es) to define strategies to search the <feature, model, parameter> space in conjunction with one another.

For example, an initial vector at a starting time h, may be represented as $(d_t^h, w_t^h, \delta_t^h)$. The heuristic-based search strategies just referenced may be implemented to obtain, in a succeeding iteration, a subsequent vector $(d_t^{h+1}, w_t^{h+1}, \delta_t^{h+1})$.

More specifically, a search strategy $s_w$ for adjusting the weights may be implemented by the weight selector 118. The weights should take into account the previous weights (i.e., of the preceding iteration(s)), as well as the performance of the corresponding models, as evaluated by the model evaluator 120. The heuristic should reflect that the better the model performance, the larger the weight.

Thus, a subsequent iteration may be calculated as $$w_t^{h+1} = S_w(w_t^h, eval(f_t)) \qquad \text{Eq. (6)}$$

That is, as just described, the subsequent iteration of the weight vector, $w_t^{h+1}$, is determined through the weight selection search strategy $s_w$, which is itself a function of the preceding weight $w_t^h$ and the evaluation(s) of effectiveness of the models $f_t$, expressed as $eval(f_t)$.

The feature selector 122 and the parameter selector 126, with each iteration of the weight vector, may synchronously select corresponding values for each feature set and parameter set for each weighted model set of the corresponding iteration. For example, as described in more detail below, a search strategy for the feature subsets may include an appropriately-defined genetic algorithm, or simulated annealing algorithm (implemented by the meta-heuristic search tool 124). Meanwhile, as also referenced above and described in more detail below, the parameter space search may be implemented using cross validation techniques for the various parameter sets.

After a number of rounds of iterations, the search process may be halted when an appropriate stop condition is reached. For example, such a stop condition may include a suitable convergence of errors between iterations, and/or a threshold number of iterations being reached, or other appropriate stop criteria.

Of course, the system 100 of FIG. 1 represents a highly simplified view of example implementations of the model vector generator 102. For example, the system 100 of FIG. 1 illustrates at least one computing device 130 that includes at least one processor 132 and non-transitory computer readable storage medium 134. That is, the example of FIG. 1 generally illustrates that one or more computing devices, perhaps in communication with one another by way of an appropriate computer network, may include one or more processors, which may execute in parallel in order to support operations of the model vector generator 102 (e.g., to implement parallel processing for the various iterations and associated search strategies of the weight selector 118, the feature selector 122, and the parameter selector 124). More specifically, one or more such processors may access and implement corresponding computer code or other instructions stored on the non-transitory computer readable storage medium 134, in order to thereby provide the incident search facilitator 102.

Of course, many other potential elements of the at least one computing device 130 are not explicitly illustrated in the example of FIG. 1, but would be apparent to one of skill in the art. For example, it will of course be appreciated that an appropriate display device may be utilized for viewing or other consumption by the user(s) of the system 100.

Further, although the model vector generator 102 is illustrated in FIG. 1 as a single element including various sub-elements, various embodiments may be implemented in which one or more of the various sub-elements are implemented separately (e.g., on separate, communicating computing devices of the at least one computing device 130). Somewhat similarly, although the various sub-elements are illustrated and described as separate, discrete components, it will be appreciated that any one such component may be implemented as two or more sub-components. Conversely, in other implementations, it may occur that any two or more of the sub-elements may be combined for implementation as a single sub-element of the model vector generator 102.

Thus, the system 100 of FIG. 1 provides an integrated weighting of the appropriate learning models, selection of feature subsets for each weighted learning model, and selection of tuned parameters for each weighted learning model. In other words, the three selection processes are not isolated from on another. When doing the feature selection, the choice of the algorithm is considered, where the choice thus takes into account the fact that the various underlying learning algorithms are sensitive to the features. For example, for some algorithms, model accuracy dramatically decreases if the number of features is high. For other algorithms, a biased data distribution in the feature space also harms the performance. Similar comments apply to parameter tuning. For example, the choice of the feature subset has an impact on the choice of kernel methods for the case of the support vector machine being included as one of the weighted models.

Further, a time needed to find a suitable solution is greatly improved. Moreover, all types of learning models may be considered with respect to the model pool 116, including the handling and inclusion of both supervised and unsupervised learning models together, and a unified way to model different types of machine learning algorithms to do model selection is provided.

Figure 2:
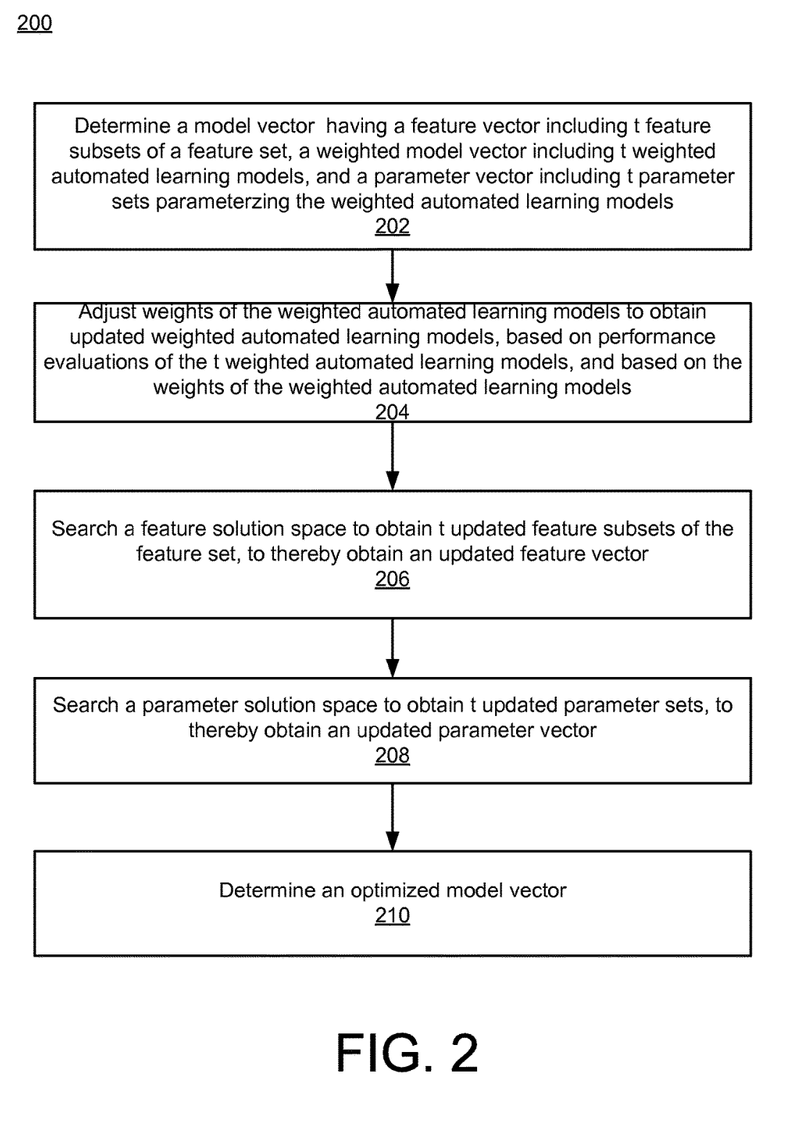
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated as separate, sequential operations. In various implementations, additional or alternative operations may be included, or one or more of the operations 202-210 may be omitted. In all such implementations, any two or more operations or sub-operations may be executed in a partially or completely overlapping or parallel manner, or in a nested, iterative, branched, or looped manner.

In the example of FIG. 2, a model vector $<d_t^h, w_t^h, \delta_t^h>$ may be determined, in which $d_t^h$ represents a feature vector including t feature subsets of a feature set, $w_t^h$ represents a weighted model vector including t weighted automated learning models, and $\delta_t^h$ represents t parameter sets parameterizing the $w_t^h$ weighted automated learning models (202). For example, the model vector generator 102 may receive the model vector request 104 of FIG. 1, and may define or otherwise determine an initial value for a corresponding model vector, based on the historical data 114 (e.g., based on a relevant feature set of the historical data 114), and on the various models of the model pool 116. The initial model vector may be stored in the model vectors 106, or otherwise held in memory. In some examples, the initial weights may be set in a trivial manner, e.g., by assigning equal weights.

Weights of $w_t^h$ may be adjusted to obtain an updated $w_t^h$, $w_t^{h+1}$, based on performance evaluations of the $_t$ weighted automated learning models, and based on $w_t^h$ (204). For example, the weight selector 118 of FIG. 1 may be configured to adjust each weight of each corresponding learning model obtained from the model pool 116, in direction corresponding to improved overall performance of the thus-weighted models. As referenced above, in order to evaluate such model performances, the model evaluator 120 may, for example, use portions of the historical data 114 as input parameters corresponding to the forecast request 110, and evaluate subsequently-calculated, but already known, output parameters corresponding to the forecast 112. In other words, the performance evaluation may include a comparison of results calculated with the weighted combination of learning models being tested with already-known results, so that a performance evaluation of the current iteration of weighted models reflects an extent to which the weighted models would have correctly calculated the known result, which thus serves as a proxy for how the thus-weighted models would perform when evaluating new or different input parameters. By moving the various weights $w_t^h$ in directions corresponding to improved overall performance of the combined weighted model as a whole, the weight selector 118 may be configured to explore the solution space of available weights in a fast and effective manner.

A feature solution space may be searched to obtain t updated feature subsets of the feature set, to thereby obtain an updated $d_t^h$, $w_t^{h+1}$ (206). For example, the feature selector 122 may implement a search of available feature space in conjunction with the updated weighted models. For examples, as described in more detail below with respect to FIGS. 3 and 4, it may occur that a given feature set includes, e.g., nine features of the historical data 114 (e.g., the types of features described above with respect to customer data, or corresponding types of features for other types of data). In this example, a feature subset associated with a given weighted automated learning model may include any one or more (e.g., five) of the total set of nine features. Meanwhile, a different weighted learning model may include the same, overlapping, or different feature subset of the total available of nine features (e.g., three different features of the nine available features). In this way, feature subsets that are optimized for the learning models that will be utilizing the feature subsets may be constructed.

A parameter solution space may be searched to obtain t updated parameter sets, to thereby obtain an updated $\delta_t^h$, $\delta_t^{h+1}$ (208). For example, the parameter selector 126 may be configured to tune each set of parameters for each corresponding weighted learning model. Thus, as with the feature subsets just referenced, parameter sets may be selected in a highly adaptable and specific manner, and in conjunction with evaluations of the feature subsets, and of the results provided by the weighted learning models.

In this way, an optimized model vector $d_t^{h+1}$, $w_t^{h+1}$, $\delta_t^{h+1}$ may be determined (210). For example, in scenarios in which operations 204, 206, 208 are performed iteratively, iterations may continue until a stop condition is reached, as described in more detail, below. In this regard, the "h+1" notation of FIG. 2 should generally be understood to represent at least one iteration of updates to the original model vector, so that, as just referenced, FIG. 2 should be understood to illustrate and include scenarios in which such iterations are conducted two or more times. Further, it will be appreciated that the term optimize or optimized model vector need not refer to an optimal solution. Instead, optimized should be understood to represent a relative term indicating that the obtained, final model vector provides a substantial improvement over an initially-selected or initial value model vector, including the providing of the optimized model vector in a resource-effective and time-effective manner.

Figure 3:
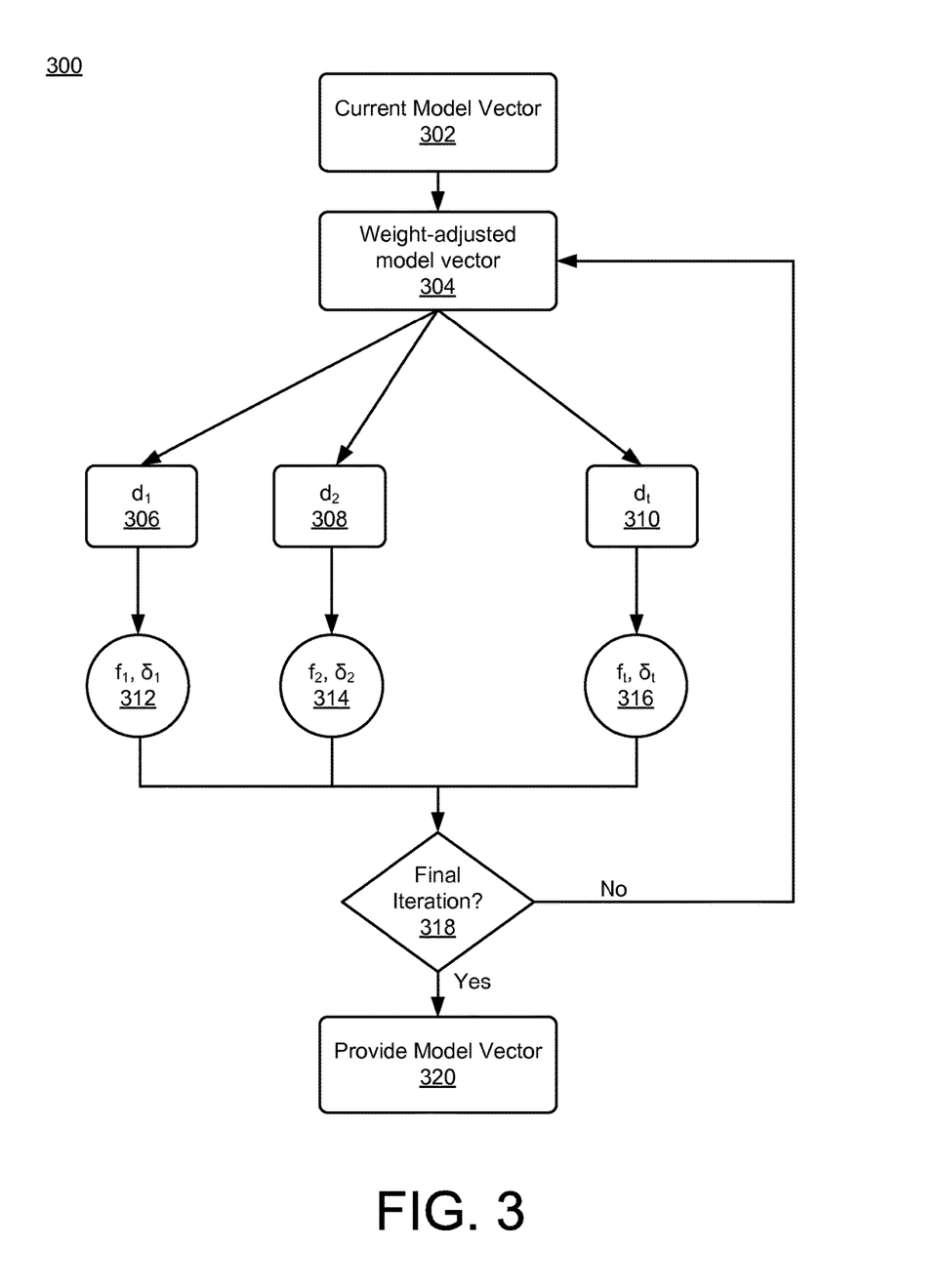
FIG. 3 is a block diagram of an example implementation of the system of FIG. 1.

FIG. 3 is a block diagram of an example implementation of the system 100 of FIG. 1. More specifically, FIG. 3 illustrates example implementations in which ensemble methods are utilized to implement the system and method of FIGS. 1 and 2. In this regard, ensemble techniques should be understood generally to refer to techniques for ensemble learning in which collections, or ensemble, of classifiers or other models are utilized together to provide results that are intended and predicted to be more accurate than to be obtained from a single algorithm.

In the example of FIG. 3, a current model vector is considered (302). As referenced above, in some implementations, the current model vector may be represented by a default or initial value (e.g., weight values) assigned to each learning model of the model vector.

After obtaining a weight-adjusted model vector (304) by the weight selector 118, the iteration may proceed to selections of feature subsets 306, 308, and 310. That is, it may be appreciated from the above discussion and notation that the $d_1$ of box 306 represents a vector including a feature subset of a total available feature set d.

Synchronously with the selection of the feature subsets of boxes 306, 308, 310, parameterization of the various weighted learning models may be implemented. For example, as referenced above, parameters $\delta_1$, $\delta_2$, and $\delta_t$ may be tuned using known or not-yet-known techniques for such parameter tuning, in conjunction with other parameters of other learning models being tuned, and together with selection and availability of a corresponding feature subset.

If a final iteration has not been reached (318), then weight adjustment of the weight of the model vector may be calculated again (304), while the various feature subsets and parameter sets are determined synchronously. On the other hand, if the final iteration has been reached (318), then the current model vector at that point in the process may be provided (310).

Figure 4:
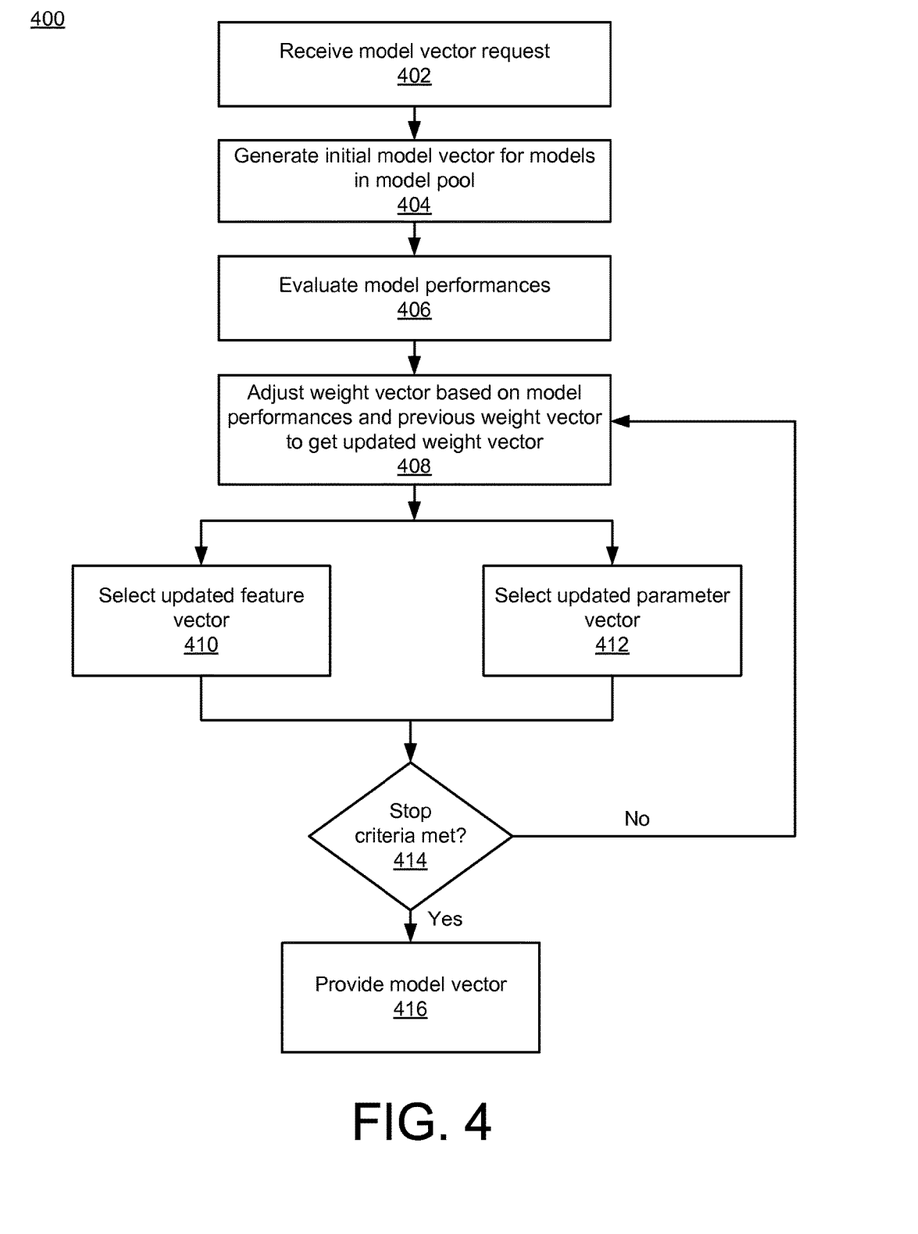
FIG. 4 is a flowchart illustrating more detailed example operations of the systems of FIGS. 1 and 3.

FIG. 4 is a flowchart 400 illustrating more detailed example operations of the system 100 of FIG. 1. In the example of FIG. 4, the model vector request 104 is received (402). For example, as described above, the model vector request 104 may be received from the user of the system 100 who wishes to extract knowledge from the historical data 114 and/or from new, related data received at the system 100 and illustrated in FIG. 1 as the forecast request 110.

The model vector generator 102 may proceed to generate, in response to the received model vector request 104, an initial model vector for the available, relevant models within the model pool 116. For example, the initial model vector may be selected randomly, or pseudo randomly. In other example implementations, an initial model vector and associated values may be determined based on availability and examination of previously-calculated model vectors that may be relevant to aspects of the model vector request 104, such as, for example, the type of historical data and the type of automated reasoning desired (e.g., classification, prediction, or reasoning).

Then, for the initial model vector selected, an initial evaluation of model performances may be conducted (406), using the model evaluator 120 in FIG. 1. For example, a learning model may be evaluated by using certain historical data as input, in order to obtain an output corresponding to data that is already known. Then, the calculated output data may be compared and validated against the already-known result. For example, for learning models attempting to predict equipment failure, historical equipment data preceding a known equipment failure may be input, to determine whether and to what extent the learning model is (or would have been) successful in predicting the equipment failure as an output.

In this way, the various weights will be adjusted in directions which improve an overall performance of the requested model vector as a whole. Similarly, the corresponding updated feature vector may be selected (410), in conjunction with selections of the updated parameter vector (412).

For example, in searching the feature solution space, and as referenced above, meta heuristic techniques may be used in which the feature solution space is explored. For example, a genetic algorithm may be implemented in which feature sets are designed as chromosomes, and tested, and then the best-performing sets are selected and inter-combined to obtain new chromosomes. This process can be repeated until a iterative stop condition is reached, so that a good (although not necessarily globally optimal) solution is obtained.

In searching the parameter solution space, as also referenced, cross-validation may be used. Cross validation generally includes partitioning relevant data, and then using one partition as training data and another partition as testing data. Then, the training data can be used to obtain parameter sets, which can then be tested using the testing data. After a number of iterations or repetitions, an average of the iterations/repetitions may be used as a performance indicator.

If a predefined start criteria has not been met (414), then the process may continue with a further adjustment to the current weight values of the various learning models (408). On the other hand, if that criteria is met (414), such as when a number of iterations have occurred, and/or an error convergence has been reached, then the resulting optimized model vector may be provided (416).

The following pseudo code illustrates an example implementation of FIG. 4:

```
Pseudo Code 1

Input:
   Historical data D
   Model pool M
   Model evaluation eval( )
1-  Initialization of the vector in <model, feature, parameter> space
        ($d_t^0$, $w_t^0$, $\delta_t^0$ )
2-  do {
        2.1-  $w_t^{h+1} = s_w(w_t^h, \text{eval}(f_t))$ with constraints
        2.2-  Choose $d_t^{h+1}$ and $\delta_t^{h+1}$ based on eval( ) using meta-heuristic
   methods
        2.3-  if (error between iterations converges/stabilizes || stop criteria)
              {
                  break;
              }
        }
3-  return
        ($d_t^h$, $w_t^h$, $\delta_t^h$ )
```

Thus, the present description provides techniques for enhancing the operations and functions of computing devices, because automated machine learning, by definition, includes a computer-based approach(es) to decision making. The present description and following claims are therefore, by their nature, particular to the technical field of automated machine learning.

Accordingly, implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one processor to:

determine a model vector $<d_t^h, w_t^h, \delta_t^h>$, in which $d_t^h$ represents a feature vector including t feature subsets of a feature set, $w_t^h$ represents a weighted model vector including t weighted automated learning models, and $\delta_t^h$ represents t parameter sets parameterizing the $w_t^h$ weighted automated learning models;

adjust weights of $w_t^h$ to obtain an updated $w_t^h$, $w_t^{h+1}$, based on performance evaluations of the $_t$ weighted automated learning models, and based on $w_t^h$;

search a feature solution space to obtain t updated feature subsets of the feature set, to thereby obtain an updated $d_t^h$, $d_t^{h+1}$, search a parameter solution space to obtain t updated parameter sets, to thereby obtain an updated $\delta_t^h$, $\delta_t^{h+1}$;

determine an optimized model vector $(d_t^{h+1}, w_t^{h+1}, w_t^{h+1})$;

receive a forecast request for a forecast related to the feature set; and provide the forecast, using the optimized model vector $(d_t^{h+1}, w_t^{h+1}, w_t^{h+1})$.

2. The computer program product of claim 1, wherein the feature set is selected from features of historical data against which the model vector will be trained and/or applied.

3. The computer program product of claim 1, wherein the automated learning models are obtained from a model pool including a plurality of automated learning models and associated machine learning algorithms.

4. The computer program product of claim 3, wherein the model pool includes both supervised and unsupervised learning models.

5. The computer program product of claim 1, wherein the instructions, when executed, are configured to cause the at least one processor to:

adjust weights of $w_t^h$ to obtain the updated $w_t^h$, $w_t^{h+1}$, including evaluating weights of $w_t^h$ by applying each of the weighted learning models using historical data, from which the feature set was obtained, as inputs to obtain corresponding outputs; and comparing the outputs against the historical data to determine an extent to which the weighted learning models were successful.

6. The computer program product of claim 5, wherein the instructions, when executed, are configured to cause the at least one processor to:

adjust weights of $w_t^h$ to obtain the updated $w_t^h$, $w_t^{h+1}$, including raising or lowering each weight in $w_t^{h+1}$, based on the compared outputs.

7. The computer program product of claim 1, wherein the instructions, when executed, are configured to cause the at least one processor to:

search the feature solution space including executing a meta-heuristic search of potential feature subsets for each feature vector.

8. The computer program product of claim 7, wherein the meta-heuristic search includes execution of a genetic algorithm in which potential feature subsets are represented as chromosomes, evaluated, and a subset of the chromosomes are selected and combined to obtain new potential feature sets.

9. The computer program product of claim 1, wherein the instructions, when executed, are configured to cause the at least one processor to:

search the parameter solution space including performing cross validation of potential parameter values using historical data against which the model vector will be trained and/or applied.

10. The computer program product of claim 1, wherein the instructions, when executed, are configured to cause the at least one processor to:

iteratively adjust the weights, search the feature solution space, and search the parameters solution space, until an optimized model vector $(d_t^{h+1}, w_t^{h+1}, \delta_t^{h+1})$ is selected after the reaching of a stop condition for the iterations.

11. The computer program product of claim 1, wherein the instructions, when executed, are configured to cause the at least one processor to:

search the feature solution space and the parameter solution space synchronously for current weight vector $w_t^h$.

12. A computer-implemented method for executing instructions stored on a non-transitory computer readable storage medium, the method comprising:

determining a model vector $<d_t^h, w_t^h, \delta_t^h>$, in which $d_t^h$ represents a feature vector including t feature subsets of a feature set, $w_t^h$ represents a weighted model vector including t weighted automated learning models, and $\delta_t^h$ represents t parameter sets parameterizing the $w_t^h$ weighted automated learning models;

adjusting weights of $w_t^h$ to obtain an updated $w_t^h$, $w_t^{h+1}$, based on performance evaluations of the $_t$ weighted automated learning models, and based on $w_t^h$;

searching a feature solution space to obtain t updated feature subsets of the feature set, to thereby obtain an updated $d_t^h$, $d_t^{h+1}$;

searching a parameter solution space to obtain t updated parameter sets, to thereby obtain an updated $\delta_t^h$, $\delta_t^{h+1}$;

determining an optimized model vector $(d_t^{h+1}, w_t^{h+1}, \delta_t^{h+1})$;

receiving a forecast request for a forecast related to the feature set; and providing the forecast, using the optimized model vector $(d_t^{h+1}, w_t^{h+1}, w_t^{h+1})$.

13. The method of claim 12, wherein the adjusting weights of $w_t^h$ to obtain the updated $w_t^h$, $w_t^{h+1}$ includes evaluating weights of $w_t^h$ by applying each of the weighted learning models using historical data, from which the feature set was obtained, as inputs to obtain corresponding outputs; and comparing the outputs against the historical data to determine an extent to which the weighted learning models were successful.

14. The method of claim 12, further comprising:

iteratively adjusting the weights, searching the feature solution space, and searching the parameters solution space, until an optimized model vector $(d_t^{h+1}, w_t^{h+1}, \delta_t^{h+1})$ is selected after the reaching of a stop condition for the iterations.

15. The method of claim 12, wherein the feature solution space and the parameter solution space are searched synchronously for current weight vector $w_t^h$.

16. A system comprising:

at least one processor; and instructions recorded on a non-transitory computer-readable medium, and executable by the at least one processor, the system including a model vector generator configured to generate a model vector for executing automated machine learning with respect to historical data, the model vector generator configured to generate the model vector through an iterative selection of values for a feature vector, a weighted model vector, and a parameter vector that comprise the model vector, the model vector generator including a weight selector configured to obtain the weighted model vector including adjusting each weight associated with a corresponding automated machine learning model of a plurality of automated machine learning models obtained from a model pool, wherein a magnitude of each weight is adjusted up or down as needed during each iteration to reflect a relative contribution of each weighted learning model to an accurate operation of the weighted model vector;

a feature selector configured to obtain the feature vector including executing a meta-heuristic search of a feature solution space of a feature set of features of the historic data, the feature vector including a plurality of feature subsets, each corresponding to a weighted learning model of the weighted model vector; and a parameter selector configured to obtain the parameter vector including searching a parameter solution space of potential parameters for each learning model of the weighted model vector, wherein each iteration of the iterative selection of values for the feature vector, the weighted model vector, and the parameter vector includes the adjusting of each weight, the searching of the feature solution space, and the searching of the parameter solution space; and further wherein the system is configured to receive a forecast request related to the feature set, and provide the forecast using the model vector.

17. The system of claim 16, wherein the weight selector includes a model evaluator configured to:

execute the adjusting of the weights next-iteration weights, including evaluating the weights by applying each of the weighted learning models using the historical data to obtain inputs to calculate corresponding outputs; and compare the outputs against the historical data to determine an extent to which the weighted learning models were successful.

18. The system of claim 17, wherein the adjusting of the weights includes raising or lowering each weight based on the compared outputs.

19. The system of claim 16 wherein feature selector executes the meta-heuristic search including executing of a genetic algorithm in which potential feature subsets are represented as chromosomes, evaluated, and a subset of the chromosomes are selected and combined to obtain new potential feature sets.

20. The system of claim 16, wherein the parameter selector is configured to search the parameter solution space including performing cross validation of potential parameter values using historical data against which the model vector will be trained and/or applied.

\* \* \* \* \*